US010556694B2

United States Patent
Burd

(10) Patent No.: US 10,556,694 B2
(45) Date of Patent: Feb. 11, 2020

(54) AIRCRAFT GALLEY CHILLER SYSTEM

(71) Applicant: Rockwell Collins, Inc., Cedar Rapids, IA (US)

(72) Inventor: Peter John Leslie Burd, Carmarthenshire (GB)

(73) Assignee: B/E Aerospace, Inc., Winston Salem, NC (US)

(*) Notice: Subject to any disclaimer, the term of this patent is extended or adjusted under 35 U.S.C. 154(b) by 192 days.

(21) Appl. No.: 15/863,742

(22) Filed: Jan. 5, 2018

(65) Prior Publication Data
US 2018/0127101 A1 May 10, 2018

Related U.S. Application Data

(63) Continuation of application No. 13/852,702, filed on Mar. 28, 2013, now Pat. No. 9,862,496.
(Continued)

(51) Int. Cl.
*B64D 13/08* (2006.01)
*B64D 11/00* (2006.01)
(Continued)

(52) U.S. Cl.
CPC .......... *B64D 13/08* (2013.01); *B64D 11/0007* (2013.01); *B64D 11/04* (2013.01);
(Continued)

(58) Field of Classification Search
CPC ............... B64D 11/0007; B64D 11/04; B64D 2013/0629; F25D 15/00; F25D 11/003;
(Continued)

(56) References Cited

U.S. PATENT DOCUMENTS 3,692,100 A * 9/1972 Gallagher, Jr. ...... B65D 88/745
165/256
3,712,078 A * 1/1973 Maynard ................. F25D 19/00
62/448
(Continued)

FOREIGN PATENT DOCUMENTS

CA  2753273 A1  9/2010
CN  1945172 A   4/2007
(Continued)

OTHER PUBLICATIONS

Chinese Office Action dated Dec. 19, 2016 issued in Chinese Application No. 201380017882.6, 4 pages.
(Continued)

*Primary Examiner* — Jianying C Atkisson
*Assistant Examiner* — Jose O Class-Quinones
(74) *Attorney, Agent, or Firm* — Suiter Swantz pc llo

(57) ABSTRACT

A modular chiller for an aircraft galley trolley compartment disposed below a galley work deck. The modular chiller includes an enclosure for components configured to chill air circulating throughout the trolley compartment. The modular chiller includes a heat exchanger for chilling air entering the enclosure from the trolley compartment through air return ports. The modular chiller includes a fan for directing air flow through the enclosure, wherein a speed of the fan is controllable by a controller thereby causing adjustment in a volume of the air passing through the heat exchanger. The modular chiller includes connection ports configured to couple the modular chiller to one or more aircraft systems, the connection ports including quick disconnect connections for aircraft line replacement units, wherein the plurality of connection ports comprise at least one connection port for supplying liquid refrigerant to the modular chiller.

14 Claims, 7 Drawing Sheets

Related U.S. Application Data

(60) Provisional application No. 61/618,526, filed on Mar. 30, 2012.

(51) Int. Cl.
*B64D 11/04* (2006.01)
*F25D 15/00* (2006.01)
*B64D 13/06* (2006.01)

(52) U.S. Cl.
CPC ...... *B64D 2013/0629* (2013.01); *F25D 15/00* (2013.01); *Y02T 50/46* (2013.01)

(58) Field of Classification Search
CPC ..... F25D 2317/0655; F25D 2317/0665; F25D 2400/20; F28F 9/0251; F28F 9/0253; F28F 9/0258
See application file for complete search history.

(56) References Cited

U.S. PATENT DOCUMENTS

| | | | | |
|---|---|---|---|---|
| 3,836,220 A * | 9/1974 | Ishammar | ............... | A47B 77/08 312/236 |
| 3,982,584 A * | 9/1976 | Spanoudis | ............ | A47J 39/006 165/42 |
| 4,077,228 A * | 3/1978 | Schumacher | ......... | A47F 3/0447 454/193 |
| 4,203,486 A * | 5/1980 | Rubbright | ............ | A47J 39/006 165/48.1 |
| 4,323,110 A | 4/1982 | Rubbright et al. | | |
| 4,361,014 A | 11/1982 | Blain | | |
| 4,384,191 A * | 5/1983 | Guibert | ................ | A23L 3/365 126/110 A |
| 4,544,024 A * | 10/1985 | Baggott | ................ | A47J 39/006 165/48.1 |
| 4,969,509 A * | 11/1990 | Merensky | ............. | B64D 13/08 165/104.34 |
| 5,477,919 A * | 12/1995 | Karube | ............... | F28D 1/05391 165/176 |
| 5,491,979 A | 2/1996 | Kull et al. | | |
| 5,501,076 A * | 3/1996 | Sharp, III | ............... | F25B 21/02 62/3.2 |
| 5,655,595 A | 2/1997 | Westbrooks, Jr. | | |
| 5,975,202 A * | 11/1999 | Grandi | .................. | A47J 39/006 165/48.1 |
| 6,637,320 B2 | 10/2003 | Grandi | | |
| 6,684,657 B1 * | 2/2004 | Dougherty | ............ | A47J 39/003 165/918 |
| 6,845,627 B1 | 1/2005 | Buck | | |
| 6,880,351 B2 | 4/2005 | Simadiris et al. | | |
| 6,907,332 B1 | 6/2005 | Huynh et al. | | |
| 6,941,764 B2 * | 9/2005 | Leroy | .................... | A47B 31/02 239/430 |
| 7,025,121 B2 * | 4/2006 | Whitehead | ............ | A47J 39/003 165/41 |
| 7,231,778 B2 | 6/2007 | Rigney et al. | | |
| 7,251,952 B2 | 8/2007 | Ozaki | | |
| 7,500,684 B2 * | 3/2009 | Van Loon | ............. | A47B 51/00 206/503 |
| 7,536,868 B1 * | 5/2009 | Ward | .................... | A47F 3/0404 62/237 |
| 7,565,903 B2 * | 7/2009 | Sasaki | ................... | B64D 11/04 126/20.1 |
| 7,661,459 B2 * | 2/2010 | Wesley | .................... | B62B 3/02 165/11.1 |
| 7,780,114 B2 * | 8/2010 | Doebertin | ............. | B64D 11/04 244/118.5 |
| 7,954,761 B2 | 6/2011 | Johnson et al. | | |
| 7,983,039 B1 | 7/2011 | Nguyen et al. | | |
| 8,056,349 B2 * | 11/2011 | Oswald | ................ | F25D 11/003 62/186 |
| 8,336,321 B2 | 12/2012 | Cur et al. | | |
| 8,387,916 B2 | 3/2013 | Baatz et al. | | |
| 9,238,398 B2 | 1/2016 | Lu et al. | | |
| 2003/0042361 A1 | 3/2003 | Simadiris et al. | | |
| 2005/0125120 A1 | 6/2005 | Huynh et al. | | |
| 2005/0210910 A1 | 9/2005 | Rigney et al. | | |
| 2008/0150630 A1 | 6/2008 | Fukuda et al. | | |
| 2008/0156030 A1 | 7/2008 | Cur et al. | | |
| 2009/0044547 A1 * | 2/2009 | Oswald | ................ | F25D 11/003 62/186 |
| 2009/0107163 A1 * | 4/2009 | Lu | .......................... | F25D 17/06 62/291 |
| 2009/0301120 A1 | 12/2009 | Godecker et al. | | |
| 2010/0050665 A1 * | 3/2010 | Oswald | ................ | F25D 11/003 62/89 |
| 2010/0071384 A1 | 3/2010 | Lu et al. | | |
| 2010/0140398 A1 * | 6/2010 | Cunningham | ........ | A47J 31/005 244/118.5 |
| 2010/0224726 A1 | 9/2010 | Lu et al. | | |
| 2012/0031127 A1 | 2/2012 | Kim | | |
| 2013/0047657 A1 | 2/2013 | Oswald et al. | | |
| 2013/0048264 A1 | 2/2013 | Lu et al. | | |

FOREIGN PATENT DOCUMENTS

| | | |
|---|---|---|
| CN | 101384483 A | 3/2009 |
| CN | 201270942 Y | 7/2009 |
| CN | 101535126 A | 9/2009 |
| CN | 201870074 U | 6/2011 |
| CN | 201968108 U | 9/2011 |
| DE | 4340316 A1 | 6/1995 |
| JP | S5154872 U | 4/1976 |
| JP | S5220787 Y2 | 5/1977 |
| JP | 06185846 A | 7/1994 |
| JP | H06185846 A | 7/1994 |
| JP | 2000220866 A | 8/2000 |
| JP | 2002306144 A | 10/2002 |
| JP | 2007537077 A | 12/2007 |
| WO | 2009149320 A1 | 12/2009 |

OTHER PUBLICATIONS

European Office Action dated Feb. 10, 2017 issued in European Application No. 13716918.1, 6 pages.
Japanese Office Action dated Feb. 14, 2017 issued in European Application No. 2015-503639, 6 pages.
Chinese Search Report, dated Jan. 8, 2016, 2 pages, from Chinese Application No. 201380017826.
International Search Report and Written Opinion dated Jul. 31, 2013 for PCT/US2013/034606.
International Preliminary Report on Patentability dated Oct. 1, 2014 for PCT/US2013/034606.

* cited by examiner

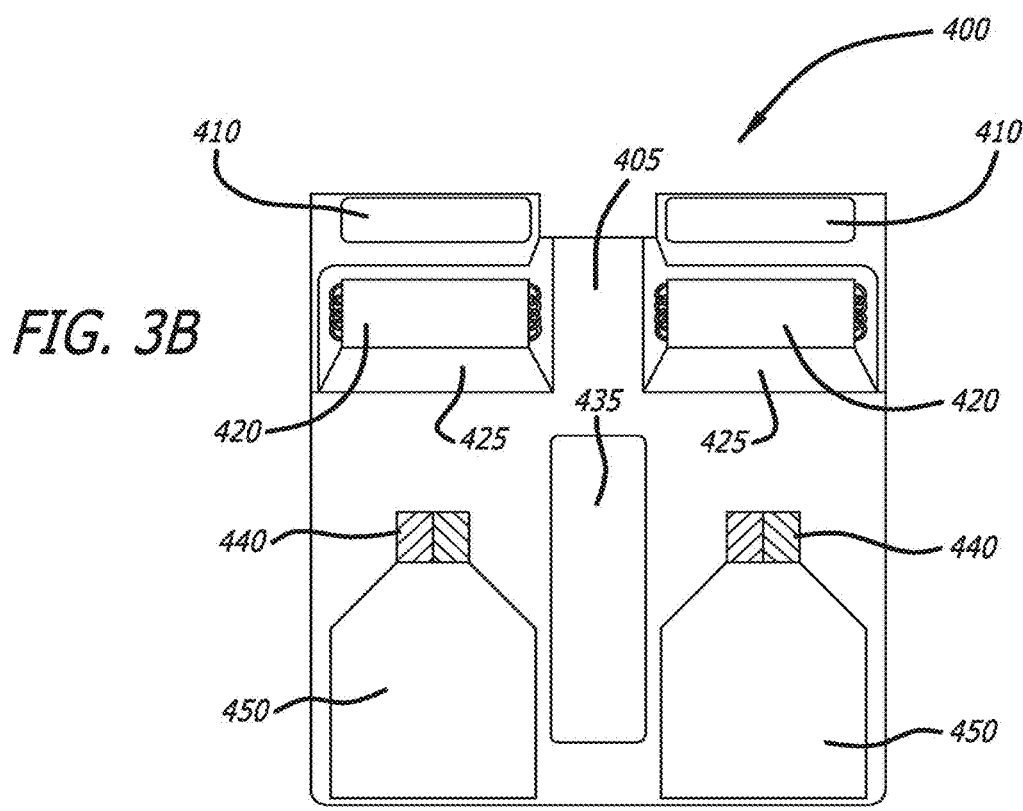
FIG. 3B
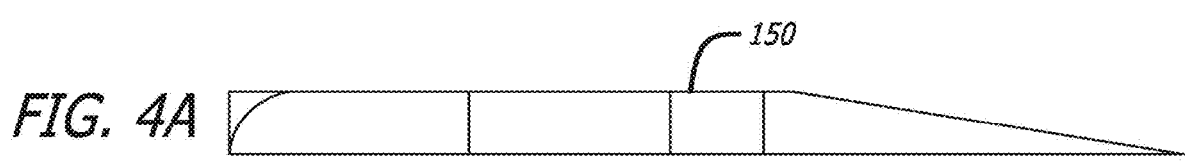
FIG. 4A
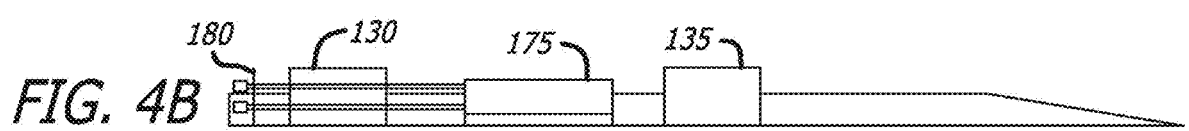
FIG. 4B
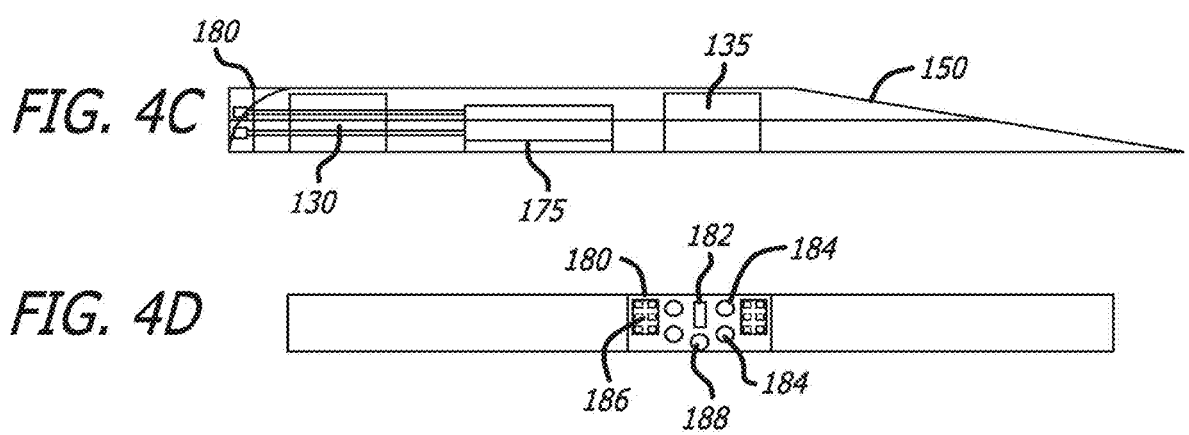
FIG. 4C
FIG. 4D

AIRCRAFT GALLEY CHILLER SYSTEM

CROSS-REFERENCE TO RELATED APPLICATIONS

This application is a continuation application, which claims the benefit of U.S. patent application Ser. No. 13/852,702, filed on Mar. 28, 2013, which claims the benefit of U.S. Provisional Application No. 61/618,526, filed on Mar. 30, 2012; U.S. patent application Ser. No. 13/852,702 and 61/618,526 are herein incorporated by reference in its entirety.

BACKGROUND

Large commercial passenger carrying airplanes predominantly employ one of two systems for keeping perishable food stuffs and non-perishable drinks at desired temperatures. Chilling is necessary to preserve perishables and make certain beverages and foods more palatable, especially during long haul and ultra-long haul aircraft journeys. The first method utilizes a standard vapor cycle based air chillers that utilize conventional refrigerant gas compression and expansion technology to generate a secondary re-circulated chilled air loop. The chilled air is generally supplied and returned via thermally insulated air ducting to and from a suitable storage structure, such as a galley. The air chiller may be located on or in the galley or mounted in part of the aircraft airframe.

The second method utilizes the same conventional refrigerant gas compression and expansion technology, but the cooling medium is a chilled liquid rather than a gas. This chilled liquid is pumped in a closed loop to and from a suitable storage structure such as a galley. The chilled liquid in some cases are configured as a large centralized system for the whole aircraft. In other cases, the chilled liquid can be circulated at each separate aircraft door galley complex to form a local area chilling loop, or be based on each individual galley as a standalone system. At the galley, the liquid is passed via a control valve and electronic control system to a heat exchanger, where an electric axial (or other) fan blows or sucks air through its matrix and around and enclosed areas of the storage structure that requires chilling, for example: a galley cart bay or compartment. The heat exchanger fan and its control system (though not necessarily all) are grouped together to form a chilled air recirculation unit that may be fitted in or on the galley or remotely from it, or the galley complex.

One drawback of these various chiller systems is that they take up a large percentage of available space in the galley, which is at a premium in an aircraft for obvious reasons. Further, the chillers tend to be very heavy, which is also a drawback to their use on aircraft. Accordingly, it would be beneficial to have a chiller system that takes up less space and reflects a reduction in weight over conventional chiller systems currently in use.

SUMMARY OF THE INVENTION

The present invention is an aircraft chilled air distribution system with a reduced overall foot print and weight. This compact system is particularly suited for an aircraft galley that requires refrigerated or cooled carts or trolleys, and/or standard meal boxes, and/or chilled compartments. The chiller system of the present invention uses a cavity created within the area commonly separating the upper and lower portions of said aircraft galley (known as the work deck area), for the installation of a chilled liquid fed chiller module with integral air distribution ductwork, a thermoelectric device or devices (using the Peltier principle) with integral air distribution ductwork, or an air chiller fed air distribution system.

The location of the invention plays a useful role in both the galley foot print and weight reduction, as well as the efficient distribution of chilled air around the below work deck installed trolley or cart. The through work deck air path, ductwork and air guiding devices are positioned for the efficient use of the chilled air to meet the certification requirements of the aircraft manufacturers.

Other features and advantages of the present invention will become more apparent from the following detailed description of the preferred embodiments in conjunction with the accompanying drawings, which illustrate by way of example the operation of the invention.

BRIEF DESCRIPTION OF THE DRAWINGS

FIG. 1b is a rear view of the compartment of FIG. 1a;

FIG. 2 is a cross-sectional view taken along lines 2-2 of the module of FIG. 1a;

FIG. 3b is a cross-sectional view of an alternate configuration of a chiller module with a reduced height;

FIG. 4a is a side view, in cross-section, of the chiller cassette;

FIG. 4b is a side view, in cross-section, of the components of the chiller cassette;

FIG. 4c is a side view, in cross-section, of the chiller cassette and components;

FIG. 4d is a rear view of the chiller cassette;

FIG. 6b is a side view of the chiller compartment of FIG. 6a;

DETAILED DESCRIPTION OF THE PREFERRED EMBODIMENTS

Figure 1A:
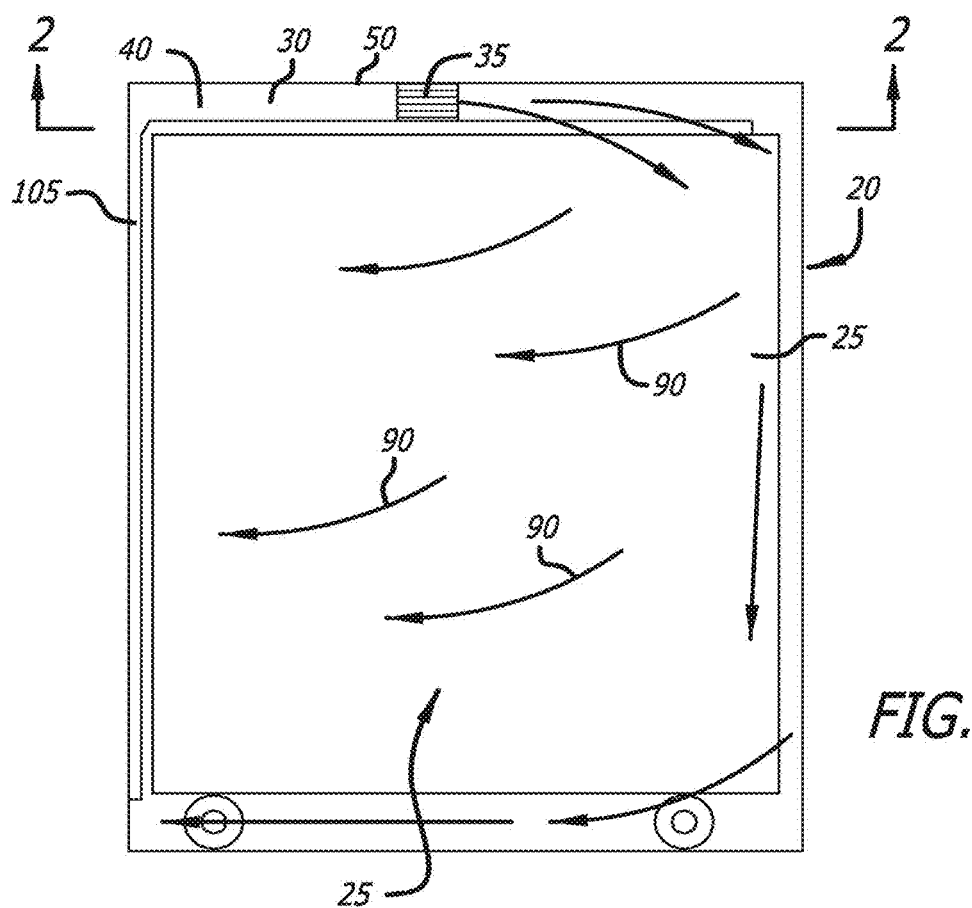
FIG. 1a is a side view of a chiller module for an aircraft galley beverage cart compartment.
Figure 1B:
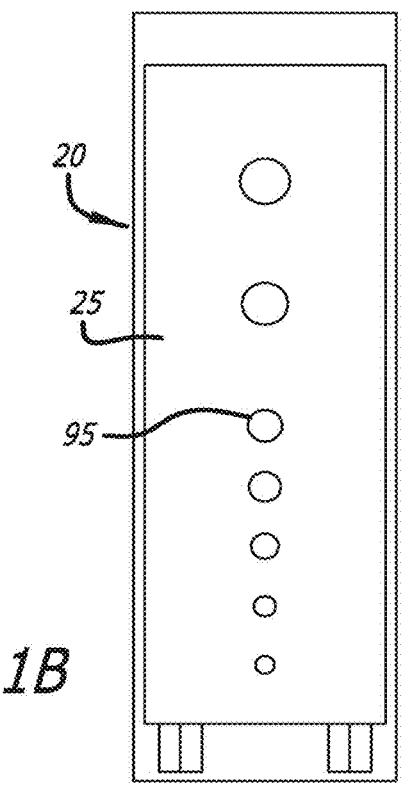

FIGS. 1a and 1b illustrate a first preferred layout for the chilled liquid supplied system of the present invention. A compartment 20 below the work deck of an aircraft galley houses a beverage cart 25, where the compartment is maintained at a below ambient temperature to keep the cart and its contents chilled. To cool the compartment, above the cart 25 is plug and play chilling module 50 comprising a heat exchanger 30 and a fan 35 arranged in a loadable cassette. The chiller module 50 itself is designed to comply with the requirements of rapid installation and removal of LRU's (line replaceable units) on commercial airplanes, and therefore has the major components grouped together to form a cassette or module that is fitted inside the work deck itself. Installation is carried out from the front or rear of the galley, or from inside the compartment from underneath the work deck.

Figure 2:
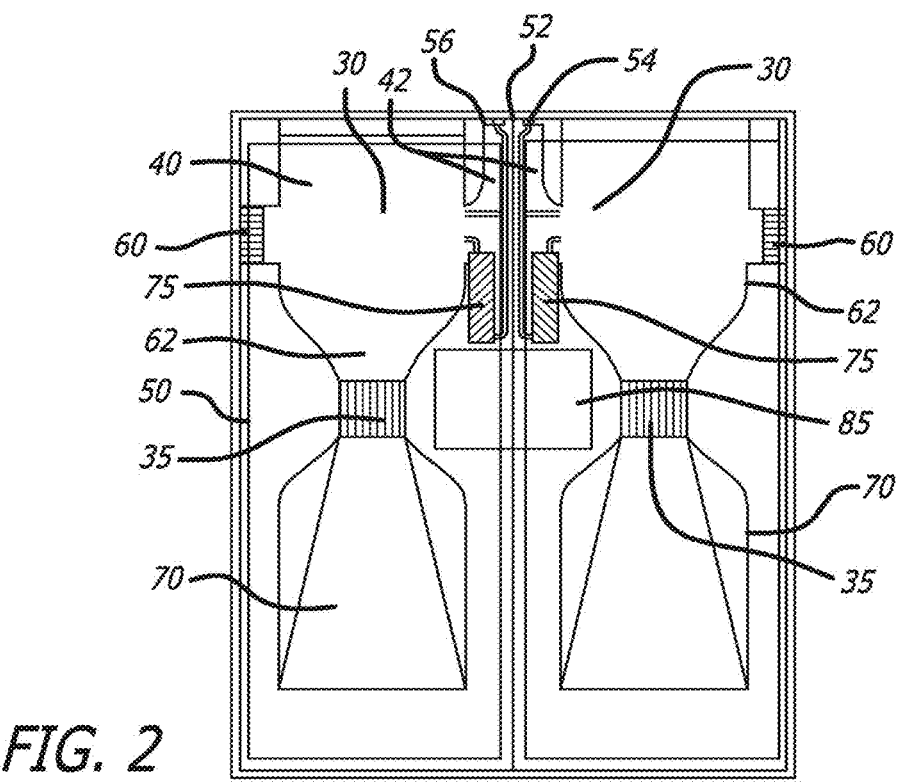

FIG. 2 illustrates a schematic of an exemplary chiller module 50. An electrical connector 52 is located at a first end to supply power to the chiller module 50, and a refrigerant input/output port 54 is located at the same location. The chilled liquid refrigerant and electric power are supplied to the chilling module 50 in a preferred embodiment via quick disconnects 52,54, while condensate is drained away at a condensate drain 56 in a similar fashion. Connection of these ports can be effected if desired only when the module 50 is installed in the compartment 20. The unit includes a pair of heat exchangers 30 connected to the air return ducts 40, and a pair of condensate collectors 42 capture condensate that forms on the heat exchanger/ducts. Each heat exchanger 30 may be equipped with a defrost fan 60, and the output of the heat exchangers 30 passes through a convergent air supply duct 62 to a tubeaxial fan 35. The fan 35 forces the chilled air out of the cassette 50 through air supply outlets 70 so that the air can be circulated through the compartment and chill the cart 25.

The proportion of chilled liquid required to chill an individual cart 25 compartment is controlled by the proportioning control valves 75. Similarly, the volume of air that needs to pass through the heat exchanger 30 is controlled by the speed of the fans 35, (which may be axial, scroll or other) under the command of the electronic control box 85 (or "E-Box"). Sensors (not shown) provide information about the conditions within each chilled compartment to allow individual control as heat load and conditions require.

The air (represented by arrows 90) is blown through a specially designed chilled air outlet in the underside of the module over and around the cart in the chilled cart bay before returning to be re-circulated via a specially designed duct at the back of the chilled cart bay. This outlet has apertures 95 that assist in creating an even air distribution around the cart. The duct is open at the bottom and the air return plenum 105 (or duct) mates snugly with the module air return port 40 in the chiller module when it is installed.

Figure 3A:
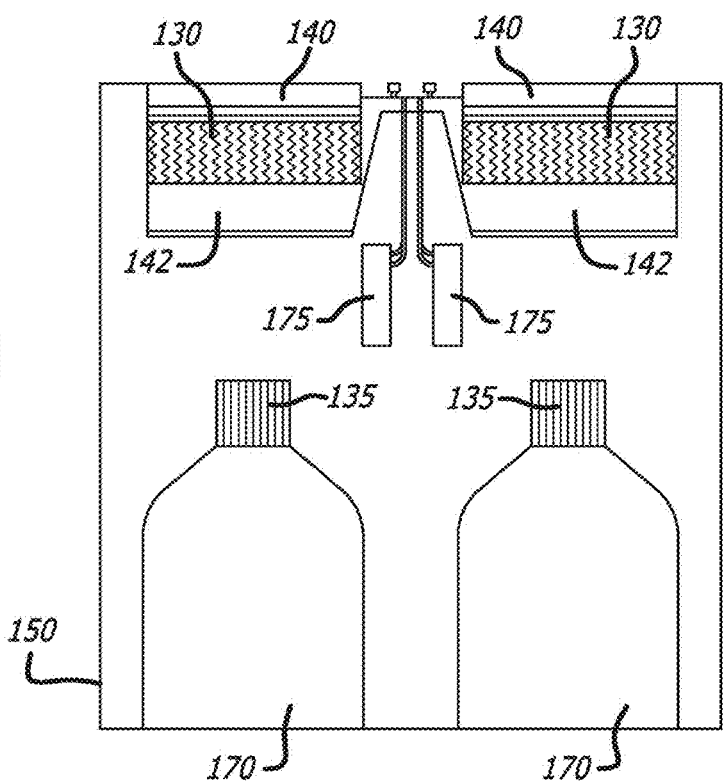
FIG. 3a is a cross-sectional view of an alternate configuration of a chiller module.

FIG. 3a illustrates an alternative layout to the chiller module of FIGS. 1 and 2. As shown in FIG. 3a, the chilling module 150 (with its top removed) includes the interface port 140 to the return air plenum (or duct), and the individual heat exchangers 130 disposed at the entrance. The chilled liquid control (PGW distribution) valves 175 are located adjacent the heater exchangers 130. Poly-glycol water ("PGW") is a one type of refrigerant that may be used with the module, although other liquid coolants may also be used.

FIG. 3b illustrates yet another alternative layout to the chiller module. The embodiment of FIG. 3b has an entrance area 400 separates two return air inlets 410 that includes electrical, chilled liquid, and condensate drainage components. A three way bypass valve area 405 is disposed between two heat exchangers 420, each including a reflector 425. The APAC 435 is situated midline flanked by a pair of tube axial fans 440 and connected deflectors 450. The overall layout of the embodiment of FIG. 3b results in a reduced vertical height as compared with other embodiments.

To assist in the removal of excess condensate, which is a by-product of moist air condensing on the heat exchangers 130, angled condensate drainage collection trays 142 are installed below the heat exchangers with outlets in the connection block 180. The air is circulated around the cart bay or chilled compartments by individual axial fans 135 in this configuration, with the supply outlets 170 leading into the chilled cart bay forming an aperture in the base of the chilling module. In this configuration, the E box is located remotely on the galley and not in the chilling module itself.

The top cover of the cassette 150 encloses all the components of the lower part to form the LRU chilling module or cassette. In FIG. 4, FIG. 4b forms the base and cooperates with the component in FIG. 4a to form the complete unit, as shown in FIG. 4c. FIG. 4d shows the rear of the chilling module 150 and its connection block 180 with the locating pin 182, chilled liquid inlet and outlet ports 184, electrical and data connectors (CANbus) 186, and the condensate drainage outlets 188.

Figure 5:
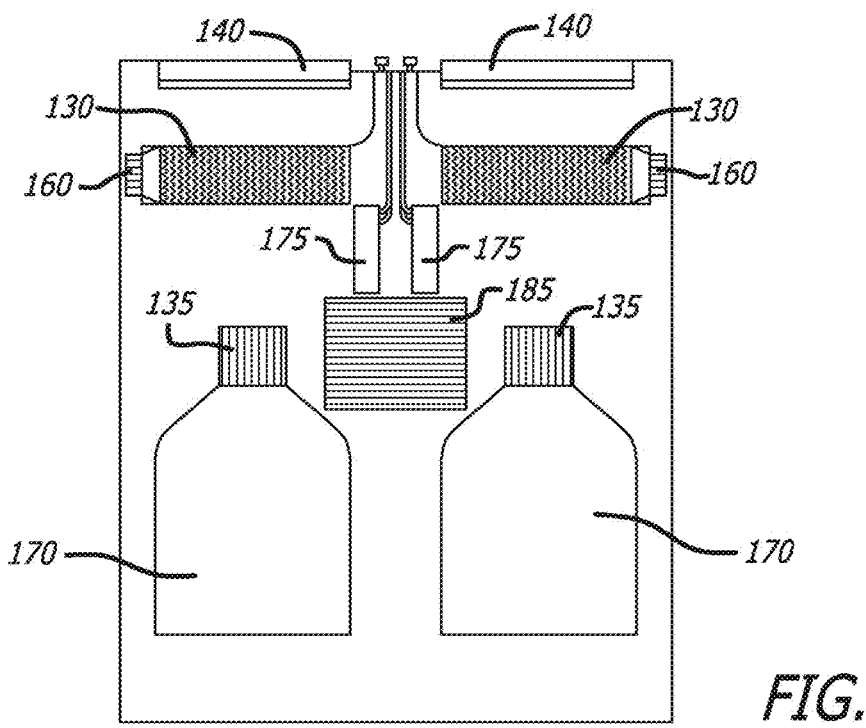
FIG. 5 is a cross-sectional view of an alternate chiller component configuration.

The embodiment shown in FIG. 5 depicts a variation of the embodiment shown in FIGS. 3 and 4 where the E box 185 is installed in the chilling module 150, separate defrost fans 160 are employed, and there is a partial re-arrangement of the major components. The base plate mounts all major components including air supply and return ports, as well as the condensate drain.

Figure 6A:
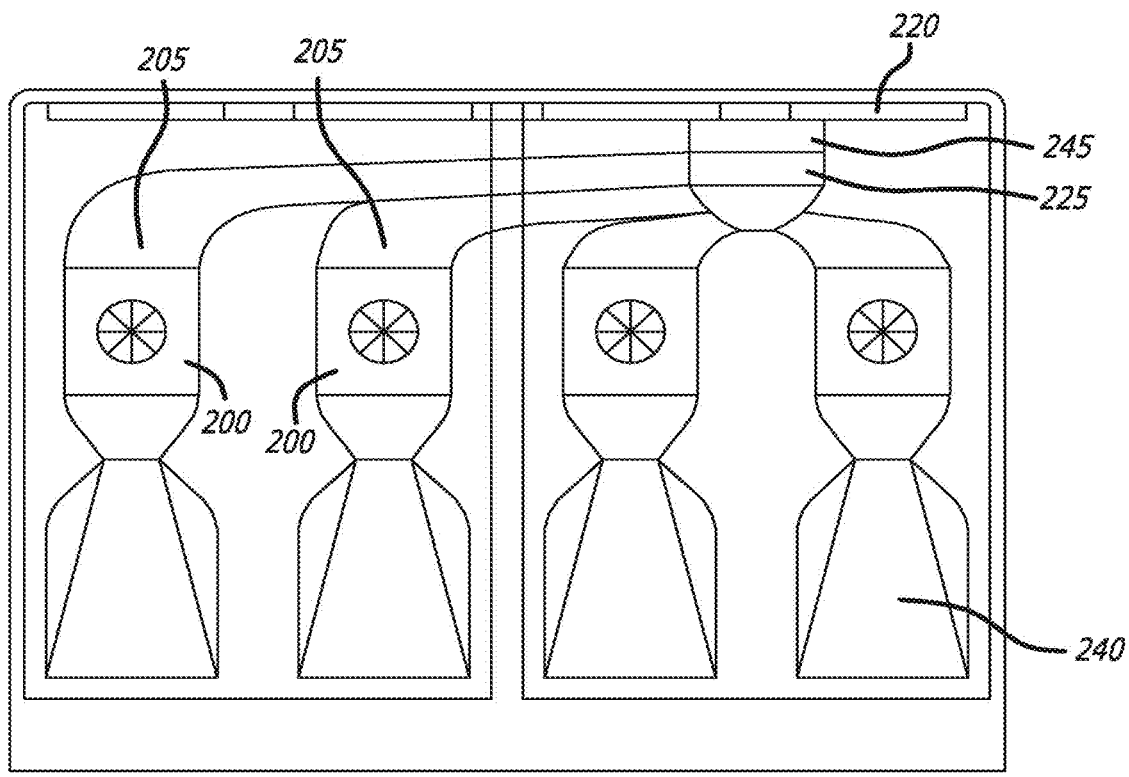
FIG. 6a is a cross-sectional view of a four cart chiller compartment ducting system.
Figure 6B:
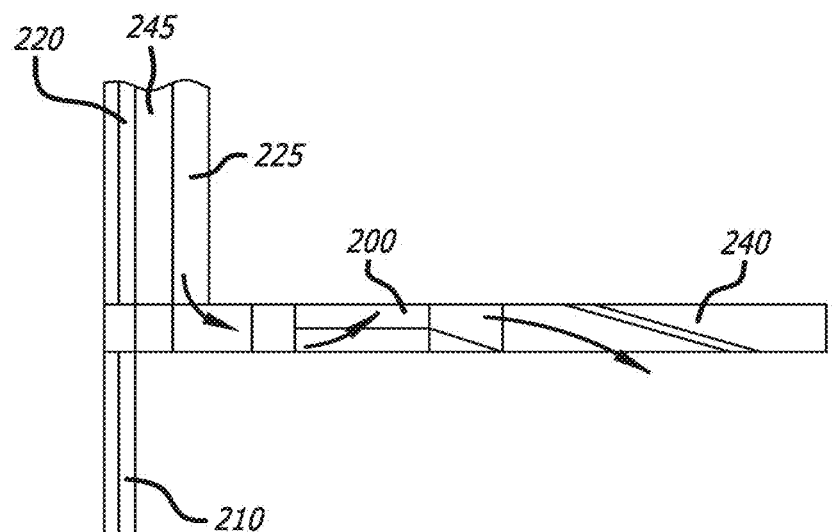

FIG. 6 illustrates a variation of the CIWD configuration where the axial fans have been replaced by scroll or periphery fans 200, and the air is supplied to the work deck area from a conventional air chiller mounted on top of the galley. In this embodiment, there is no heat exchanger or E box mounted in the chilling module, although the fan could be speed controllable from a remote source.

Air distribution is achieved using a modular ductwork 205 or by a common plenum at the rear of the work deck that mates with the chilling module. The chilled air return duct at the rear of the cart bay 210 connects with a return above work deck (AWD) duct 220 on the back wall of the galley, that returns the air to the air chiller. The chilled air supply duct 225 connects the air chiller to the distribution ductwork with the work deck area to the air chiller. The below work deck (BWD) chilled air return duct 210 and chilled air supply outlet 240 are similar in design to the other configurations. A vertical services column 245 is provided above work deck.

FIGS. 7 and 8 show a work deck chilling system and system layout for both the air chiller supplied (FIG. 7) and chilled liquid supplied (FIG. 8) through work deck galley refrigeration systems. The schematics show the components used in the air chiller supplied Chiller In Work Deck (CIWD) system. 7a illustrates the over laid air supply duct 300 that leads down from the air chiller 310 on top of the galley to the common air distribution plenum. The air fed system differs from the liquid in that the work deck area splits to form the two halves of the ducting necessary to distribute the air between the separate cart bays. Balance is achieved using interchangeable tapered restrictors 320 (FIG. 7c) to provide differing proportions of air to each cart depending on the galley configuration.

Figure 7A:
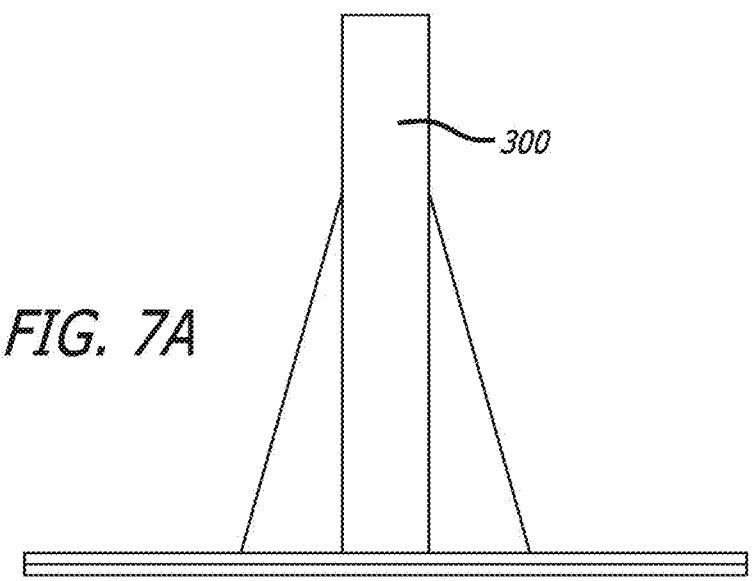
FIG. 7a is a front view of an air chiller system supply duct.
Figure 7B:
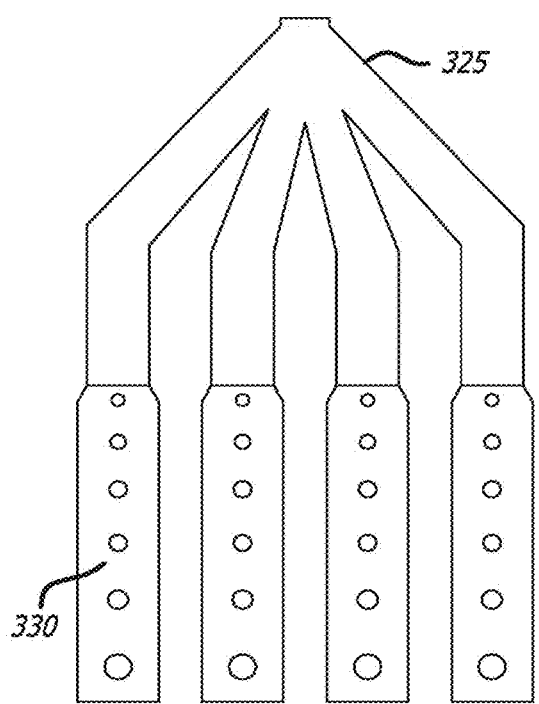
FIG. 7b is a front view of the air chiller return duct.
Figure 7C:
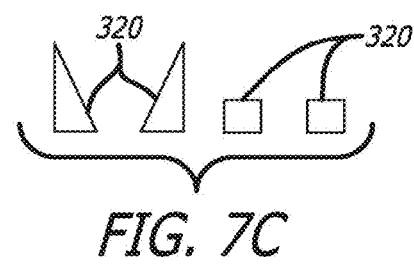
FIG. 7c are front and plan views of tapered restrictors for the ducting system.
Figure 7D:
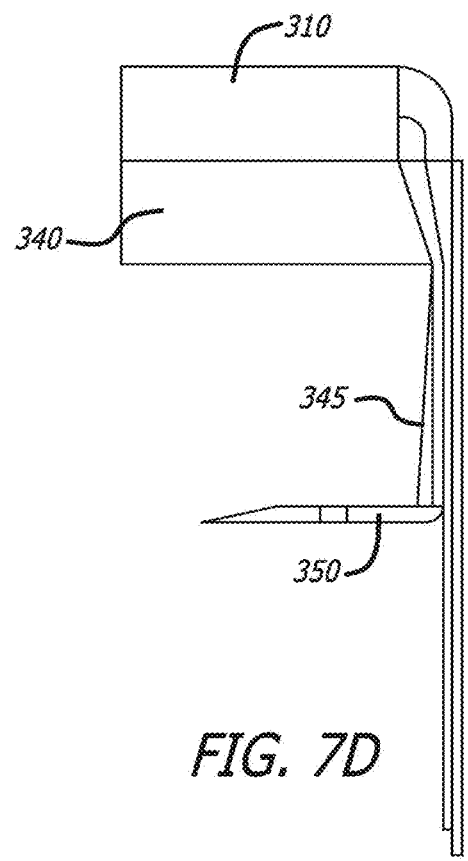
FIG. 7d is a side view of the chiller ducting system.

FIG. 7b illustrates the AWD (above work deck) air return duct that is mounted on the back wall of the galley. This duct 325 connects to the below work deck (BWD) chilled air return ducts 330. FIG. 7d illustrates the position of the air chiller 310 on top of the galley, where this design utilizes a horizontal service area 340 between the standard containers (meal boxes) forming the upper storage compartments and the chilled air supply and return passes 345. The position of the chiller 310 in this instance is designed to meet the requirements of a center line aircraft galley. In a lateral or aft galley complex that is installed the air chiller may well be mounted below the airplane floor or behind the galley. In this case, the air distribution through the work deck is maintained although the supply and return duct work and possibly on the outside of the envelope of the galley. FIG. 7d also illustrates the through work deck air distribution ducting 350.

Figure 8A:
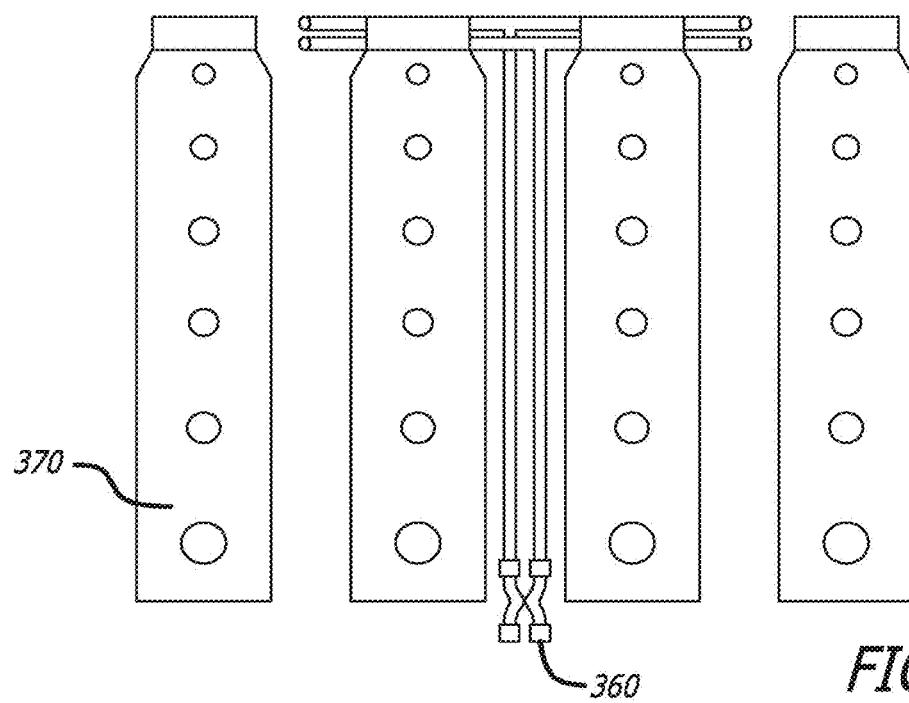
FIG. 8a is a front view of a liquid chiller system duct and manifold.
Figure 8B:
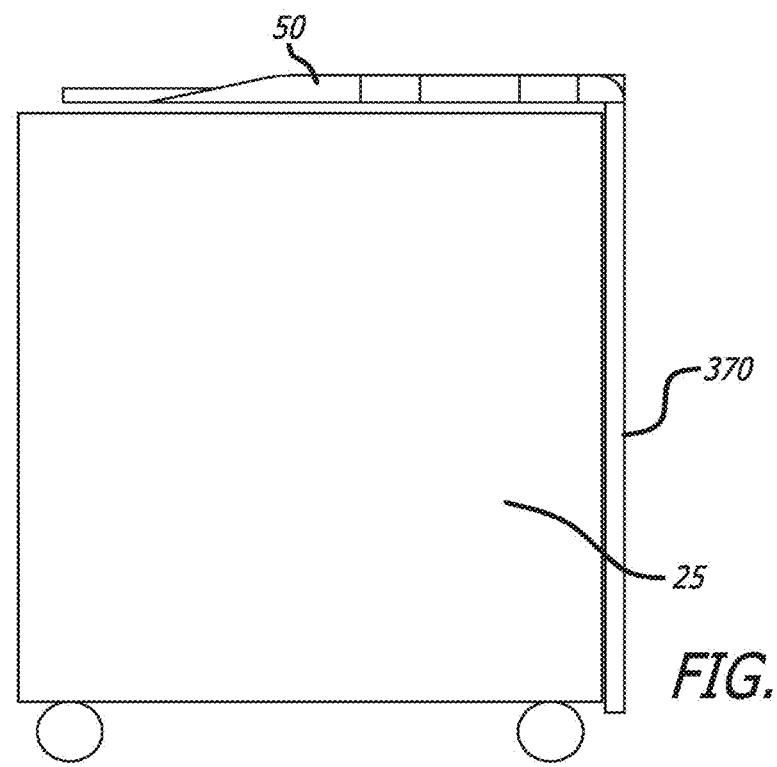
FIG. 8b is a side view of the liquid chiller system in the beverage cart compartment.

FIG. 8a illustrates the chilled liquid supply 360 and return manifold pipe work 370 at the back of the galley chilled cart compartment, which terminates in the CIWD module interface block. FIG. 8b illustrates the side view of the CIWD module and cart within the compartment below the work deck.

The present invention may include 34" or 35" deep refrigerated center-line galleys (installed along the centerline of the aircraft) by utilizing the work deck cavity as a means of circulating chilled air around a cart or trolley compartment. The invention utilizes the potential of the work deck cavity as a location to horizontally mount a refrigeration module (LRU) containing a heat exchanger, fan, fluid control valve and electronic control system that is capable of chilling the cart compartments to the required temperature using chilled liquid as a cooling medium. The present invention further utilizes the potential of the work deck area as a location of duct work for distribution of chilled air produced by a vapor cycle type air chiller mounted on, in or remotely from, the galley.

It will be apparent from the foregoing that while particular forms of the invention have been illustrated and described, various modifications can be made without departing from the spirit and scope of the present invention. Accordingly, it is not intended that the invention be limited but rather all modifications and substitutions that would be recognized by one of ordinary skill in the art are intended to be included in the scope of the invention.

What is claimed is:

1. A modular chiller for an aircraft galley trolley compartment disposed below a galley work deck, comprising:
    an enclosure for one or more components configured to chill air circulating throughout the trolley compartment, the enclosure configured to be removably inserted into the trolley compartment and horizontally mounted proximate to an upper surface of the trolley compartment; the one or more components comprising:
        two heat exchangers for chilling air entering the enclosure from the trolley compartment through one or more air return ports;
        at least one fan for directing air flow through the enclosure, wherein a speed of the at least one fan is controllable by a controller thereby causing adjustment in a volume of the air passing through the two heat exchangers;
    a plurality of connection ports configured to couple a modular chiller to one or more aircraft systems, the connection ports including quick disconnect connections for aircraft line replacement units, wherein the plurality of connection ports comprise at least one connection port for supplying liquid refrigerant to the modular chiller; and
    the modular chiller, wherein the modular chiller includes two return air inlets that each include condensate drainage, and a three way bypass valve disposed between the two heat exchangers, each heat exchanger having a reflector and an axial fan, each axial fan having a connected deflector.

2. The modular chiller of claim 1, wherein a lower surface of the enclosure, when removably inserted into the trolley compartment, is configured to be disposed adjacent to a trolley housed within the trolley compartment.

3. The modular chiller of claim 2, further comprising a connection block disposed on a rear surface of the modular chiller, the connection block including the connection ports configured to couple the modular chiller to the one or more aircraft systems.

4. The modular chiller of claim 2, wherein the connection ports further include at least one of an electrical connector, a condensate drain, and a locating pin.

5. The modular chiller of claim 2, further comprising a control valve coupled to the two heat exchangers, the control valve configured to control a supply of liquid refrigerant to the two heat exchangers.

6. The modular chiller of claim 2, wherein the two heat exchangers includes a convergent supply duct configured to couple an outlet of the two heat exchangers to the fan.

7. The modular chiller of claim 6, further comprising a condensate collection tray configured to divert collected condensate at the two heat exchangers toward a condensate drain.

8. The modular chiller of claim 2, wherein the enclosure includes the one or more air return ports configured to mate to a plenum disposed along a rear wall of the trolley compartment when the enclosure is removably inserted within the trolley compartment.

9. The modular chiller of claim 8, wherein the plenum further includes a plurality of apertures disposed on a surface of the plenum, the plurality of apertures configured to promote a uniform air distribution around the trolley housed within the trolley compartment.

10. An aircraft galley trolley compartment cooling system, comprising:
    a trolley compartment below a galley work deck, the trolley compartment housing a plurality of trolleys;
    a modular chiller unit mounted in the galley trolley compartment above the plurality of trolleys, the modular chiller including a fan, two heat exchangers, an air supply outlet, and a fan speed control; and
    a plenum against a rear wall of the galley trolley compartment including an air return path leading from the bottom of the trolley compartment to the modular chiller above the plurality of trolleys, the plenum including apertures vertically spaced along a front surface to allow return air to enter the return air path along various elevations of the plenum,
    wherein the modular chiller includes two return air inlets that each include condensate drainage, and a three way bypass valve disposed between the two heat exchangers, each heat exchanger having a reflector and an axial fan, each axial fan having a connected deflector.

11. The aircraft galley trolley compartment cooling system of claim 10, wherein the modular chiller further comprises a connection block having an electrical connector, a condensate drain, a locating pin, and a liquid input/output port on a control surface opposed to the rear of the trolley compartment.

12. The aircraft galley trolley compartment cooling system of claim 10, wherein the modular chiller circulates a liquid refrigerant and the liquid refrigerant is poly-glycol water.

13. The aircraft galley trolley compartment cooling system of claim 10, wherein a sensor in the trolley compartment signals a condition in the trolley compartment that is used by an electronic control box to adjust a speed of the fan.

14. The aircraft galley trolley compartment cooling system of claim 10, wherein the modular chiller is cantilevered over the plurality of trolleys when the plurality of trolleys is positioned within the trolley compartment.

* * * * *